US008038090B2

(12) United States Patent
Wilson et al.

(10) Patent No.: US 8,038,090 B2
(45) Date of Patent: Oct. 18, 2011

(54) SYSTEM AND METHOD FOR THE RETRIEVAL OF A SMALLER UNMANNED AERIAL VEHICLE BY A LARGER UNMANNED AERIAL VEHICLE

(75) Inventors: Richard Wilson, Beverly, MA (US); Adam Woodworth, Melrose, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 392 days.

(21) Appl. No.: 12/407,231

(22) Filed: Mar. 19, 2009

(65) Prior Publication Data

US 2010/0237183 A1 Sep. 23, 2010

(51) Int. Cl.
*B65D 3/00* (2006.01)
*B65D 47/00* (2006.01)
(52) U.S. Cl. ........................................... 244/1 TD
(58) Field of Classification Search ............. 244/1 TD, 244/3, 158.2, 1 R, 100 C, 100 F, 100 G
See application file for complete search history.

(56) References Cited

U.S. PATENT DOCUMENTS

| 2009/0127387 A1* | 5/2009 | Larkin | 244/1 TD |
| 2011/0006151 A1* | 1/2011 | Beard | 244/3 |

* cited by examiner

*Primary Examiner* — Timothy D. Collins
*Assistant Examiner* — Nicholas McFall
(74) *Attorney, Agent, or Firm* — Katten Muchin Rosenman LLP (57) ABSTRACT

A system and method are provided for using a first aircraft to retrieve a second aircraft. The first aircraft is typically larger than the second aircraft. A minimum airspeed of the first aircraft is typically greater than a maximum airspeed of the second aircraft. The first aircraft flies in a substantially circular pattern and extends a tow line, such that the tow line forms a substantially helical shape behind and below the first aircraft. Due to the helical shape, there is at least one point along the extended tow line at which the speed of the tow line is substantially equal to the speed of the second aircraft. The second aircraft can readily latch onto the tow line at that point, thereby minimizing potential damage otherwise caused by differential airspeeds.

6 Claims, 8 Drawing Sheets

SYSTEM AND METHOD FOR THE RETRIEVAL OF A SMALLER UNMANNED AERIAL VEHICLE BY A LARGER UNMANNED AERIAL VEHICLE

BACKGROUND OF THE INVENTION

1. Field of the Invention

The invention relates to aircraft recovery systems. More particularly, this invention relates to a system and method for recovery of a smaller unmanned aerial vehicle (micro aerial vehicle (MAV)) by a larger unmanned aerial vehicle.

2. Background Art

Figure 1:
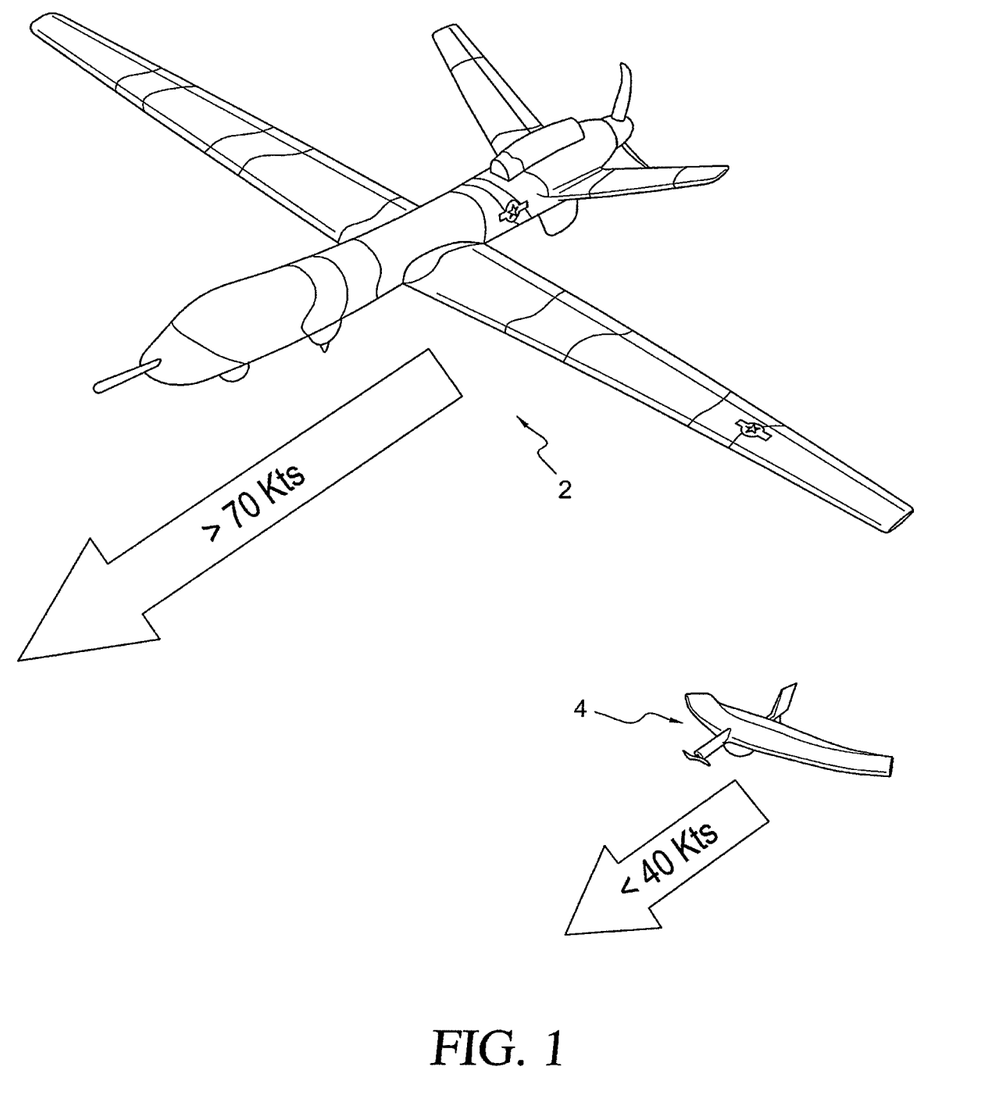
FIG. 1 illustrates an unmanned aerial vehicle and a micro aerial vehicle flying side by side thereby demonstrating their relative size and speed.

Unmanned aerial vehicle (UAV) technology has proven to be an essential surveillance tool. UAV technology is so pervasive, that unmanned aircraft are not uncommon on the daily television news. Though larger UAVs are typically shown, the variety of vehicles in the field is actually much larger. In general terms, though, the types of aircraft can be divided into two different groups. In the first group are the long range, high altitude, and relatively high speed UAVs, with optical sensor and/or synthetic aperture radar (SAR) payloads. In the second group are micro air vehicles (MAVs). MAVs can be hand launched, have limited endurance, operate at low altitude, and travel at lower speeds. FIG. 1 illustrates a large unmanned aerial vehicle and a micro aerial vehicle flying side-by-side, thereby demonstrating their relative size and speed. Nonetheless, MAVs provide high quality, narrow field-of-view imagery that can be useful in law enforcement and border patrol.

A system or method that synergistically combines the advantages of both MAVs and larger UAVs will yield a truly revolutionary capability. For example, a larger UAV can be used as a mother-ship to both deliver and recover MAVs. This creates the capability of rapidly deploying MAVs at much farther distances than ever before. Once deployed, the MAVs can be used to gain high quality narrow field-of-view surveillance, or perhaps land in remote locations and engage in long term monitoring activities. To avoid loss of the aircraft technology and data, to minimize use of personnel in perhaps difficult environment, and to allow reuse of the MAV and sensor payload, the MAV can rejoin the UAV mother-ship. Unfortunately, no satisfactory method truly exists for recovery of MAVs by a UAV at the present time.

If the UAV and MAV had similar flight envelopes, then the problem would be relatively straightforward. This is generally not the case, however, as larger UAV's suitable to the task can fly only as slow as 70-260 knots, while small MAVs have a top speed of only about 30 knots. This disparity in speed means that the capture problem is significant.

One of the earliest studies into a "long line" loiter technique was performed and patented (U.S. Pat. No. 1,829,474) by C. Chilowsky. The invention introduces the idea of an aircraft orbiting at a specified radius and velocity, from which hangs a payload orbiting with a much smaller radius and velocity, and provides some basic calculations for determining the relation between the two radii.

Today the system introduced by Chilowsky is primarily used to collect and deploy equipment and supplies, specifically in remote areas. Missionary groups frequently perform "bucket drops" from a circling plane to provide isolated villages with gifts and provisions. The most widely publicized of these drops is known as Operation Auca. During these drops, a Piper PA-14, piloted by missionary Nate Saint, would circle in a tight spiral over Waodani jungle territory in Ecuador. While in this maneuver, a second man lowered a basket of supplies as gifts to the tribe, who in turn, would send back gifts of their own. This proved to be an effective means of delivery between the two parties and correspondence continued for over three months. The bucket method continues to be used, with many investigations into making it a more efficient and sophisticated air delivery system. For example, such a system could be employed to lower supplies onto a sea-going vessel, among other types.

Another example of a use of the "long line" technique involves the use of two orbiting aircraft as discussed in U.S. Pat. No. 4,416,436. In this system, two aircraft enter into a circular orbit centered around the payload to be transported. A cable with a small weight or drogue shoot is attached to each of the aircraft and lowered to the payload. While the aircraft continue to orbit, the cable is lowered and attached to the payload by ground personnel. The payload is then lifted a safe distance from the surface before a de-orbit procedure is initiated, in which one of the aircraft (aircraft A) reduces its bank angle thereby increasing its orbital radius. With the second aircraft (aircraft B) maintaining its current bank angle, it quickly approaches the first until the two are flying parallel to each other with the payload dangling between them; the cables are then reeled in to reduce drag. At no point during this procedure do the aircraft change their speeds. Upon arriving at the delivery site, the aircraft release the cables and again enter into a circular orbit (by applying different bank angles). Once in the circular pattern, the payload is decelerated with the use of a small parachute and the two aircraft slowly descend until the payload makes contact with the surface.

In addition to the transfer of equipment and supplies, it has also been suggested that this system be employed in the surveillance of enemy territory, as discussed in U.S. Pat. No. 6,705,573. According to this configuration, an aircraft lowers sensors and other equipment from its fuselage until they are a certain distance apart, enabling the observation of the area below the aircraft while the aircraft maintains a safe position.

As is self evident of many of the examples discussed above, each relies on the skill of the pilot to accurately identify the target area, as well as to maintain the location of the payload once circular flight has been established. This task is further complicated by the presence of wind which can result in vertical oscillation of the payload. It is clearly desirable to develop a method to counteract this effect as well as one that will place less emphasis on the skill of the pilot or controller. One possible solution to this problem was proposed in 1998 by using electronic sensors and detection devices as discussed in U.S. Pat. No. 5,722,618. Near-stationary positioning of the payload can be accomplished in a number of ways. In the first, a GPS sensor positioned on the aircraft can be used to alter the aircraft's trajectory to ensure the center of the circular flight path coincides with the target area; alternatively the sensor may be placed on the payload and the aircraft can be repositioned to match the payload coordinates with those of the desired location. A third approach again places a sensor on the payload capable of detecting signals from the target and determining the relative position between them. Near-stationary vertical motion is established by situating an altitude sensor on the payload, the output of which is delivered to the orbiting aircraft. By monitoring the payload altitude, the aircraft can either change its velocity, altitude, or the length of the line to maintain desired height. In addition, the positioning of thrust devices on the payload could enable it to move independently of the aircraft to which it is attached (for small increments).

Research into long-line placement of objects continues undiminished. For example, Pavel Trivailo and a team of engineers at the Royal Melbourne Institute of Technology in Australia are currently exploring new applications for the "bucket drop" maneuver, working on an automated system that will allow them to pick up and place payloads with minimal impact. Such a system will be highly beneficial for rescue missions and deliveries in areas in which human access is extremely difficult. To this end the team performed numerous simulations based on fuzzy logic, the Chebyshev-pseudospectral method, and optimal flight configurations to analyze the dynamic properties of a towed payload, specifically the control laws that govern the cable and the cable-payload assembly. In performing these simulations, they were able to identify the factors that contribute most to the stabilization of the cable (length, thickness, aircraft speed, etc.). With these factors determined, they developed a system controller that monitors and adjusts the position of the payload by automatically letting out or reeling in the tow line.

It should be noted that while all of the above prior art examples appear to be, at the least, interesting uses of long-line placements of objects, none of the prior art recognizes, teaches, suggests, or comprehends that extending a long line from an aircraft can be used for anything more than placement and/or retrieval of objects on or near stationary locations. Therefore, notwithstanding all of the above, a need still exists for the safe capture of micro UAVs (MAVs) by larger UAVs such that the needs of various police, firefighting, border patrol, drug enforcement, and military agencies are met.

SUMMARY OF THE INVENTION

It is therefore a general object of the invention to provide a system and method for safely capturing MAVs that will obviate or minimize problems of the type previously described.

According to a first aspect of the present invention, a method of using a first aircraft to retrieve at least one second aircraft into a first aircraft is provided. The method comprises the steps of: flying the first aircraft along a first path; extending a tow line from the first aircraft such that the flying of the first aircraft along the first path causes a helical shape to be formed by the extended tow line behind and below the first aircraft; determining a point on the extended tow line at which a tow line speed is substantially equal to a second aircraft speed for each of the at least one second aircraft; adjusting an altitude of the first aircraft or the at least one second aircraft such that an altitude of the point on the extended tow line at which the tow line speed is substantially equal to the at least one second aircraft speed is substantially equal to an altitude of the at least one second aircraft for each of the at least one second aircraft; and securing each of the at least one second aircraft to the extended tow line. The method may further comprise the step of retracting the extended tow line and the secured at least one second aircraft into the first aircraft. A ratio of a length of the first aircraft to a length of the at least one second aircraft may be greater than or equal to 4:1. A minimum first aircraft speed may be greater than a maximum second aircraft speed. The first path may be substantially circular, or alternatively, the first path may be substantially elliptical.

The tow line may comprise a catch basket positioned at or near a bottom portion of the extended tow line. The method may further comprise the steps of: after securing the at least one second aircraft to the extended tow line, flying the first aircraft along a substantially straight path, such that the extended tow line is configured to form a substantially straight line behind and below the first aircraft; causing the at least one second aircraft to slide down the extended tow line into the catch basket; and retracting the extended tow line, the catch basket, and the secured at least one second aircraft into the first aircraft.

In another aspect, the invention provides a system for using a first aircraft to retrieve at least one second aircraft into a first aircraft. The system comprises: an extendable tow line attached to the first aircraft, wherein the extendable tow line is configured to be extended from the first aircraft as the first aircraft flies, and further wherein, when extended from the first aircraft as the first aircraft flies along a first path, the extended tow line is configured to form a substantially helical shape behind and below the first aircraft; and a capture device attached to the at least one second aircraft, wherein the capture device is configured to latch each of the at least one second aircraft to the extended tow line from the first aircraft at a point on the tow line wherein a speed of the extended tow line is determined to be substantially equal to a speed of each of the at least one second aircraft. The first path may be substantially circular; alternatively, the first path may be substantially elliptical. A ratio of a length of the first aircraft to a length of the at least one second aircraft may be greater than or equal to 4:1. A minimum first aircraft speed may be greater than a maximum second aircraft speed for each of the at least one second aircraft.

The first aircraft may comprise an unmanned aerial vehicle (UAV). Each of the at least one second aircraft may comprise a micro-unmanned aerial vehicle (MAV). The system may further comprise a catch basket, positioned at or near a bottom of the extended tow line. The catch basket may be configured to catch and store each of the at least one second aircraft after each of the at least one second aircraft has been latched onto the extended tow line.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE PREFERRED EMBODIMENTS

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

The synergistic combination of the advantages of both micro-aerial vehicles (MAVs) 4 and larger UAVs provides advanced and enhanced forward observations, strategic reconnaissance, and other information gathering capabilities. According to a preferred embodiment, in order to facilitate deployment of such a system, a larger UAV is used as mother-ship 2 to both deliver and recover MAVs 4. MAVs 4 can therefore be rapidly deployed at much longer ranges than has ever been achievable. MAVs 4 rejoin mother-ship 2 through a unique and non-obvious recovery operation according to a preferred embodiment.

According to an exemplary embodiment, a large UAV mother-ship (mother-ship) 2 can dispense one or more MAVs 4 at a desired location to perform surveillance (as those of ordinary skill in the art can appreciate, "surveillance" refers to not only to "looking" but also information gathering, whether it is video, infrared, electronic/electrical, acoustical, and/or environmental data, among many other types). According to an exemplary embodiment, mother-ship 2 can transport one or more MAVs 4, release them in the desired area, and then act as an airborne station for data collection, communications relay, and redeployment of the one or more MAVs 4, effectively expanding the mission capability of the smaller vehicles. This "marsupial robot" approach enables a cost effective surveillance system that combines the high speed, long duration, and expensive mother-ship 2 with the low speed, short duration, near-expendable MAVs 4. Exemplary embodiments of this system can be applied to fields as diverse as the monitoring of forest fires and border patrol, data collection in relief situations, chemical plume detection and tracking, or law enforcement, among others.

As discussed above, a significant obstacle in the combined use of larger, faster UAVs, and smaller, slower MAVs, is the ability of the UAVs to release and capture the MAVs. For example, using nets to recapture MAVs creates the possibility of damage to the MAV, and the flight dynamics of the larger UAV could be significantly altered by the necessary hardware for such a system.

As discussed above, the primary challenge to recapture of the MAVs by UAVs arises from the large speed difference between the UAVs and the MAVs as illustrated in FIG. 1. Cruise speeds typical of large UAVs center around 70 knots, but can go as high as 260 knots. In the future, the size and air speeds of larger UAVs (mother-ship 2) are bound to increase, while the airspeeds of MAVs 4 will generally stay about the same. In contrast, the average airspeeds of most MAVs range from about 20 to about 30 knots, with a few capable of achieving about 40 knots. The relative speed between the two aircraft, in straight line flight, can therefore range from about 30 to about 220 knots, making low kinetic energy air-to-air recovery of MAVs practically unattainable. However, a system and method according to an exemplary embodiment reduces the relative speeds to at or about zero and allows for mid-air capture of MAV 4 by mother-ship 2.

Figure 2:
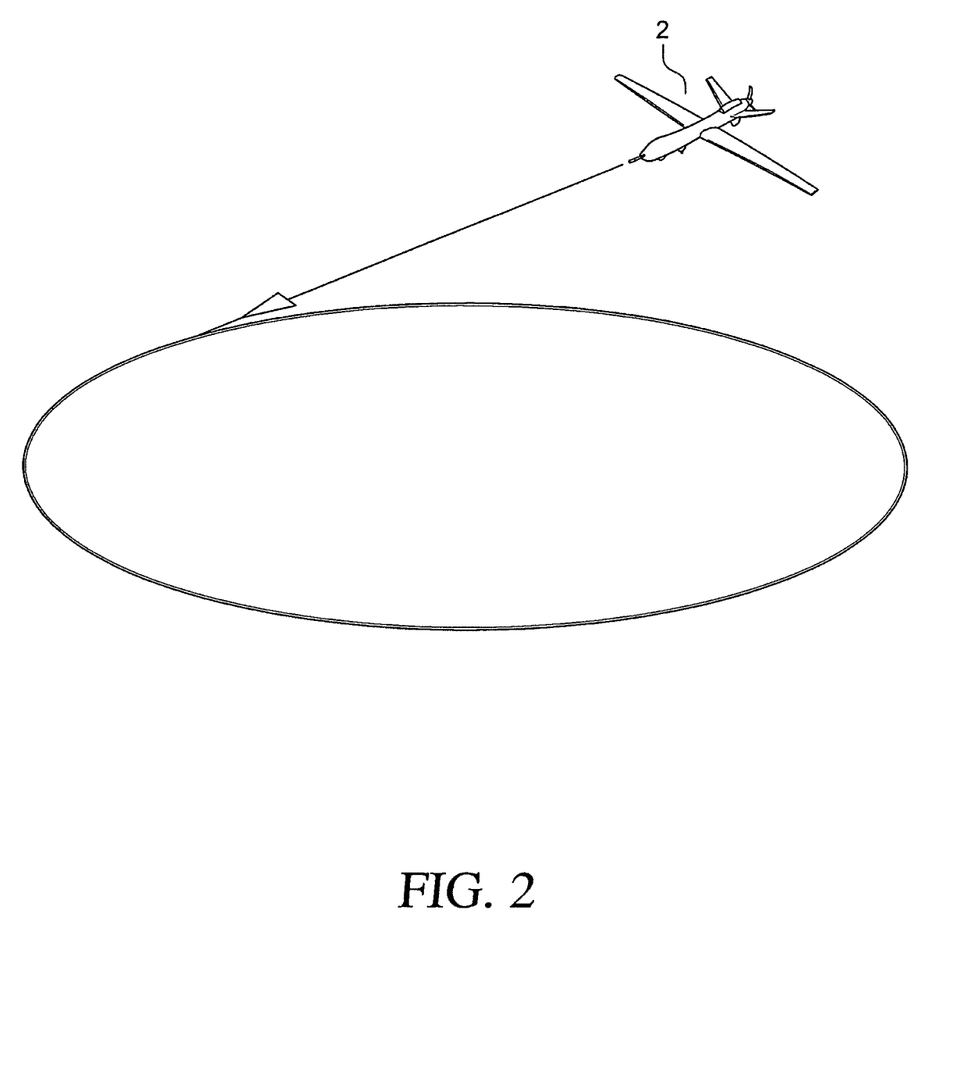
FIG. 2 illustrates an unmanned aerial vehicle entering a circular flight path according to an embodiment of the present invention.
Figure 3:
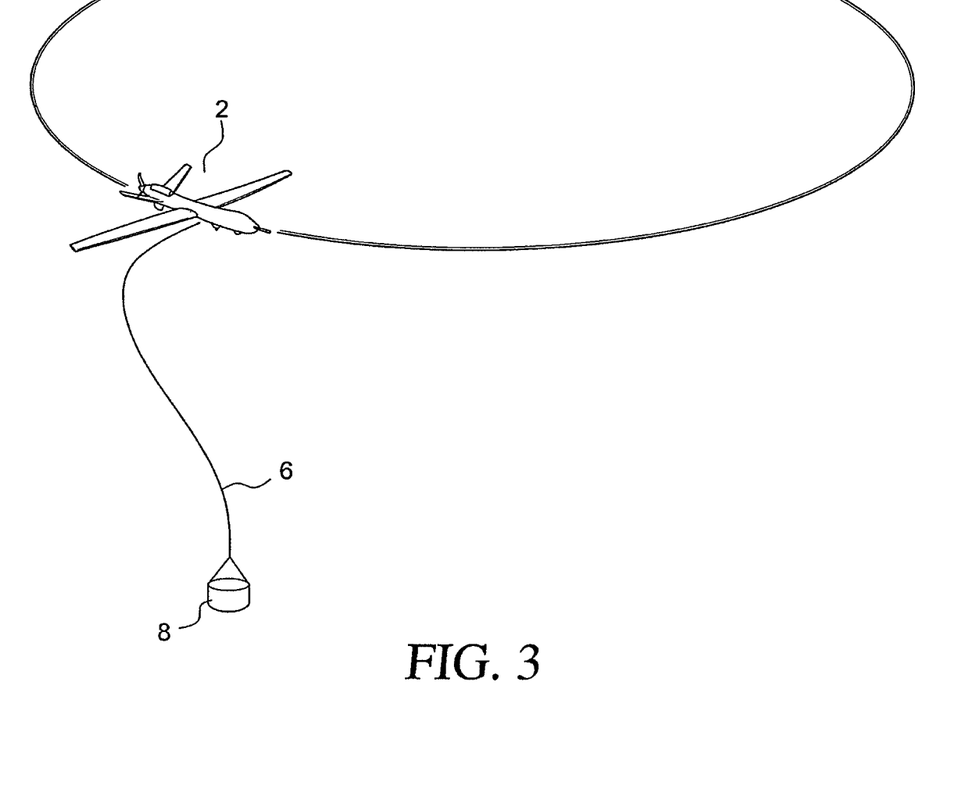
FIG. 3 illustrates the unmanned aerial vehicle of FIG. 2 extending out a tow line according to an embodiment of the present invention.
Figure 4:
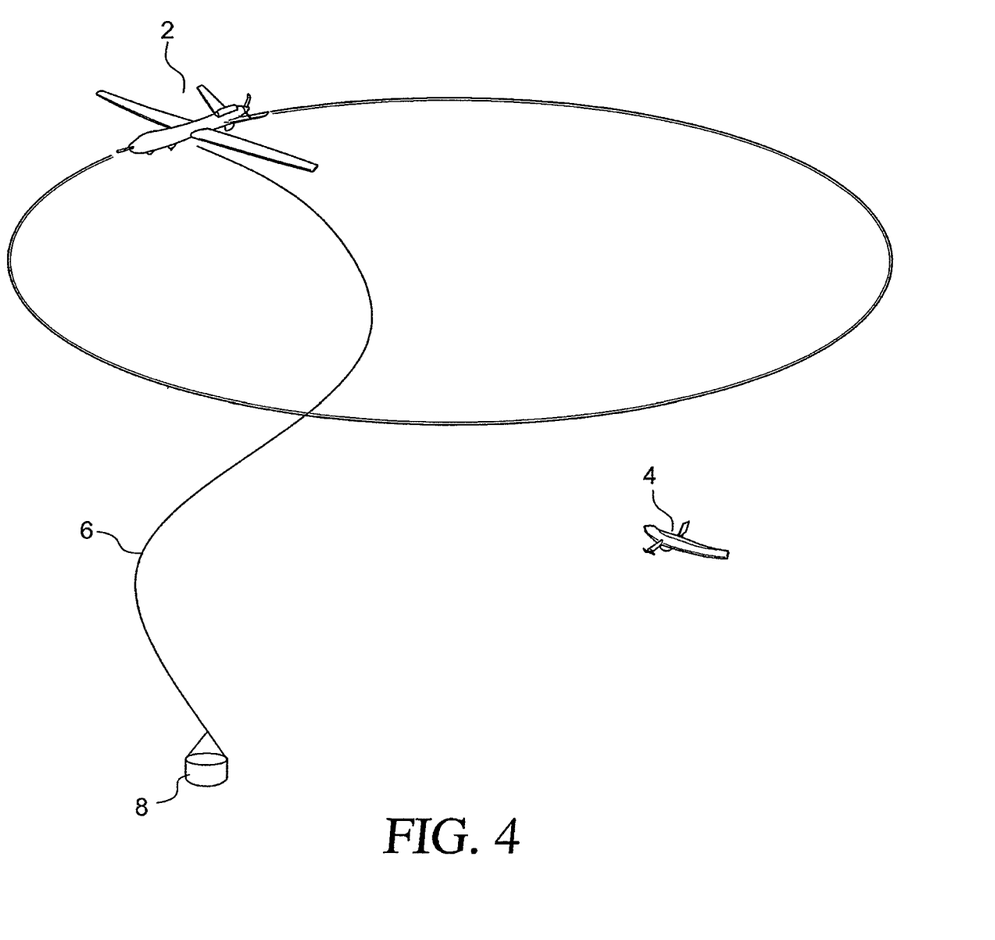
FIG. 4 illustrates the unmanned aerial vehicle of FIG. 2 with the tow line substantially completely extended out, and a micro-unmanned aerial vehicle approaching the tow line according to an embodiment of the present invention.

Referring now to FIGS. 2-8, the system and method according to an exemplary embodiment of the present invention are discussed. As shown in FIG. 2, mother-ship 2 enters into a circular flight path. Weighted recovery tow line (tow line) 6 is connected to a winch mechanism in mother-ship 2 that normally is kept stowed within mother-ship 2 for good aerodynamic performance. In FIG. 3, mother-ship 2 lets tow line 6 out when it is time to recover MAV 4. Mother-ship 2 continues to fly in a substantially circular path while tow line 6 is extended out. Tow line 6 trails behind mother-ship 2 and the forces of gravity and drag, combined with the motion of mother-ship 2, causes tow line 6 to create an inverted conical helix in the sky, as shown in FIG. 4.

Figure 5:
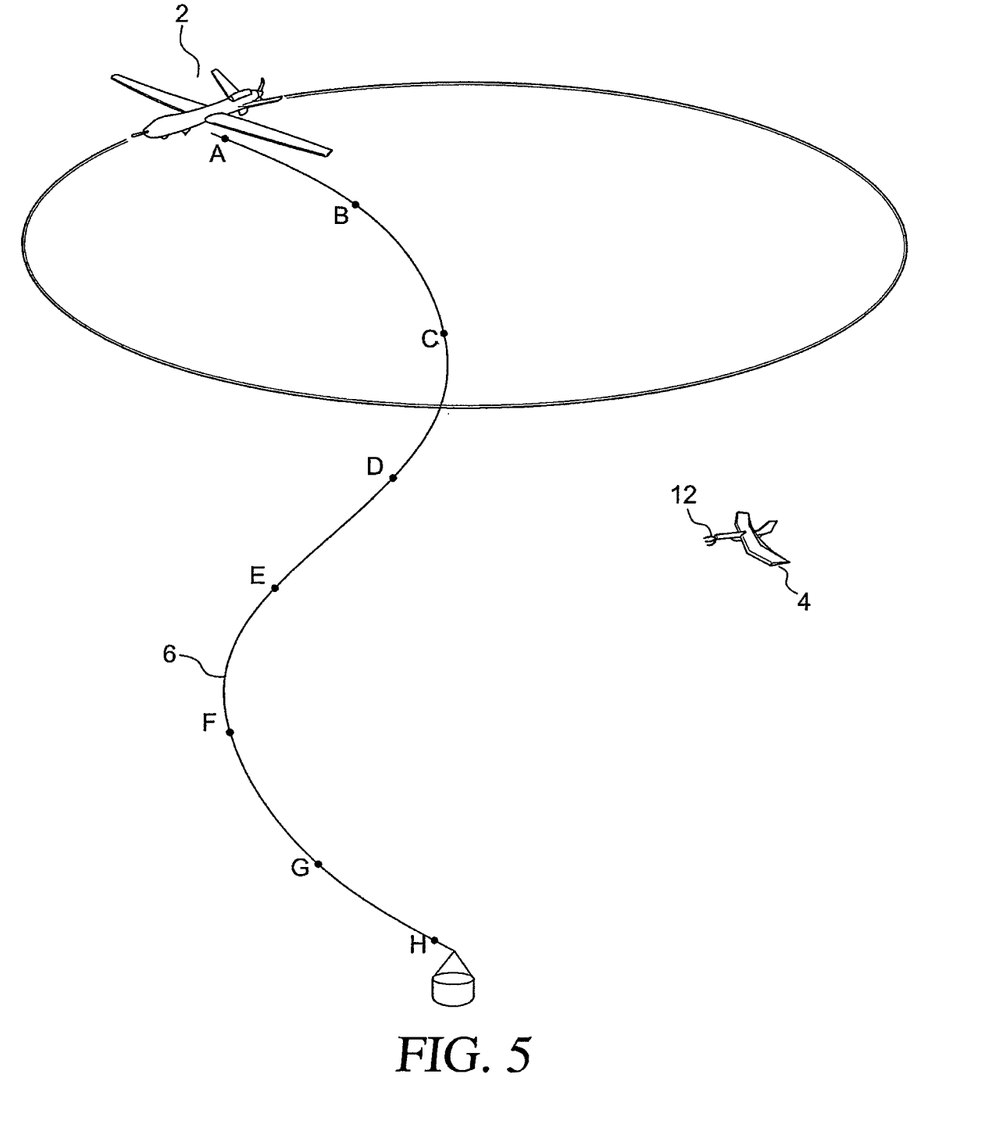
FIG. 5 illustrates several different velocity points along the substantially completely extended out tow line according to an embodiment of the present invention.

Depending on the physical properties of line length, mass, and drag, combined with the flight path of mother-ship 2, the tip of tow line 6 can be made to scribe a variable diameter circle in the sky, or it can be made to remain stationary as it spins about itself. According to a preferred embodiment, as tow line 6 assumes a helical shape, a range of circumferential velocities along the length of tow line 6 is created, with the highest of these speeds found at the spool in the aircraft (the speed of the UAV itself, between about 70-260 knots) and the lowest speed is located at the tip of tow line 6, which can have as low as zero velocity. FIG. 5 illustrates several different velocity points (points A-H) along the substantially completely extended out tow line 6 according to an exemplary embodiment. The velocity of point A would be the same as mother-ship 2, and the velocity at point H can be as low as 0 knots, or about 0 knots.

Figure 6:
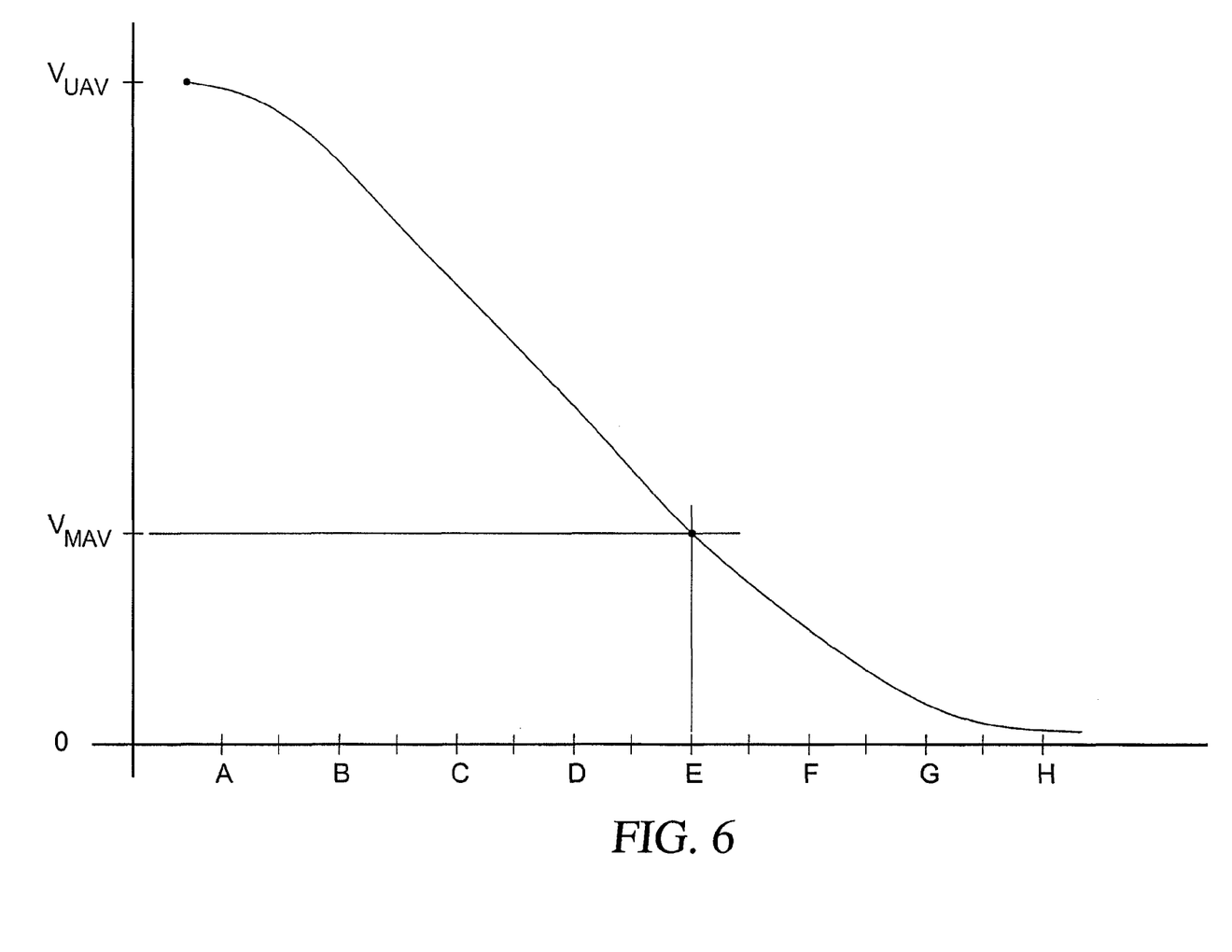
FIG. 6 illustrates a chart of velocity points along the tow line versus position on the tow line according to an embodiment of the present invention.

Therefore, at some point along tow line 6, the speed of any known MAV 4 will be found. By adjusting the altitude of MAV 4 relative to tow line 6, a suitable speed that matches that of MAV 4 can be found. FIG. 6 illustrates a graph of tow line 6 speed versus position along tow line 6. Note that at point A, the velocity of tow line 6 matches that of mother-ship 2, and that at point H, the velocity of tow line 6 is approximately zero. As an example, the velocity of MAV 4 is found to be about the same as point E, so MAV 4 will adjust its altitude to match that of point E, and begin to maneuver to intercept tow line 6. In the process of maneuvering to intercept tow line 6, MAV 4 will, as those of ordinary skill in the art can appreciate, slightly speed up, or slow down, in order to approach and physically intercept tow line 6 with as little speed differential as possible. MAV 4 may also make slight changes in altitude, resulting in slight changes of the relative speed of the MAV 4 with respect to the speed of the tow line 6.

Capture of MAV 4 can be accomplished through use of MAV line capture device (capture device) 12. Capture device 12 grabs hold of tow line 6, which can then either retract tow line 6, or, if additional MAVs 4 are going to be captured, will allow MAV 4 to slide down tow line 6 into capture basket 8.

Figure 7:
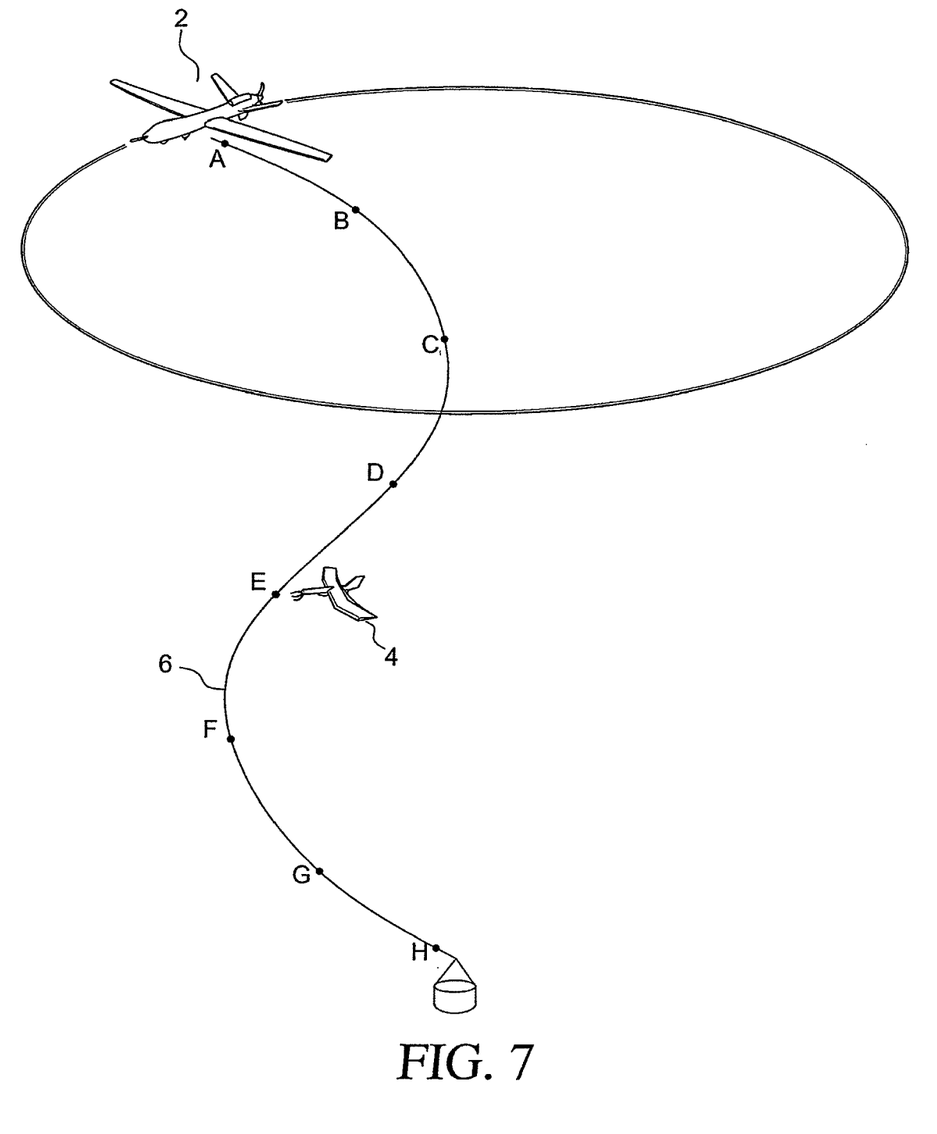
FIG. 7 illustrates the micro-unmanned aerial vehicle approaching the substantially extended out tow line to become attached to the tow line according to an embodiment of the present invention.
Figure 8:
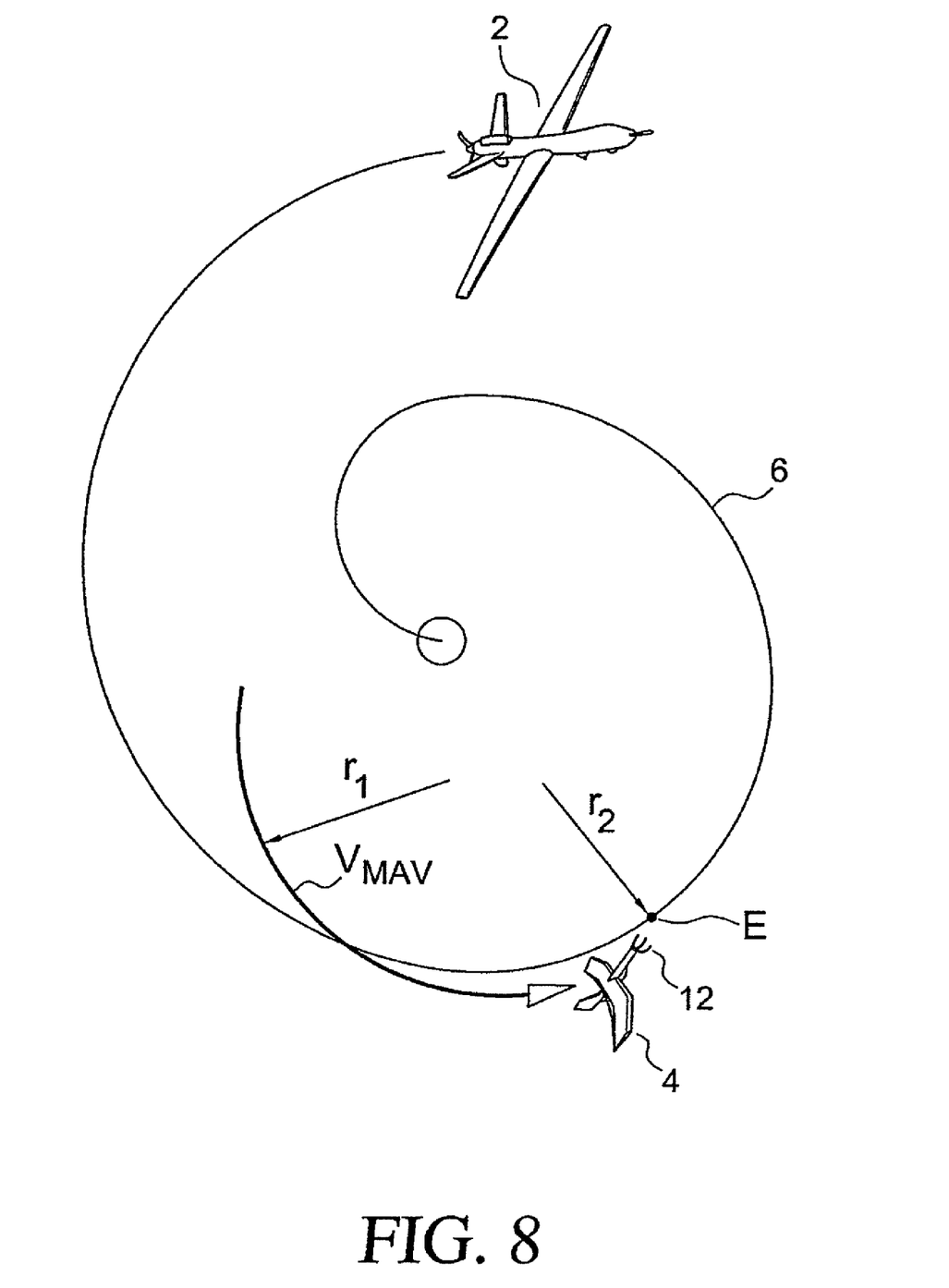
FIG. 8 illustrates a top view of the tow line shown in FIG. 7 as the micro-unmanned aerial vehicle approaches the tow line according to an embodiment of the present invention.

Following capture, according to an exemplary embodiment, telemetry between MAV 4 and mother-ship 2 informs mother-ship 2 that MAV 4 is securely attached to tow line 6. Mother-ship 2 can now wait for additional MAVs 4 or proceed immediately to straight and level flight. When mother-ship 2 flies straight and level, this causes tow line 6 to straighten out and as it does so, MAV 4 slides down tow line 6 until it lands in capture basket 8. Shielded from high winds, the one or more MAVs 4 are winched aboard mother-ship 2 until capture basket 8 is safely returned to the fuselage. Alternatively, a MAV 4 that is capable of withstanding the high airspeed of the mother-ship 2 can just lock itself to the tow line 6. FIG. 7 illustrates MAV 4 as it intercepts tow line 6 from a side view, and FIG. 8 illustrates the interception of tow line 6 by MAV 4 from a top view. FIG. 8 illustrates one possible method of flying into tow line 6 by MAV 4.

In this unique manner, tow line 6 solves the major problem of matching the velocities of mother-ship 2 and MAV 4, and substantially alleviates other problems as well, such as terminal guidance and control. Terminal guidance and control problems are substantially alleviated because the end of tow line 6 represents a near stationary target. A first, simplest guidance solution, uses a combination of a global positioning system (GPS) to bring mother-ship 2 and MAV 4 proximity close together, and an optical stroboscopic method using beacons on tow line 6, for micro-navigation at short range (i.e, distances between zero and approximately 30 meters). The stroboscopic method has the distinct advantage of allowing MAV 4 to "see" the point on tow line 6 that is traveling with the same speed as MAV 4 and thus creates a point with near-zero relative speed on which to connect. In this method, MAV 4 and mother-ship 2 continue to rotate until tow line 6 and MAV 4 connect. According to an exemplary embodiment, MAV 4 can use actuated clamp, or passive "carabiner" or a passive "jam cleat" (i.e., capture device 12) to connect to extended tow line 6. Once connected, MAV 4 engine can be instantly turned off so that it cannot actively affect the motion of tow line 6. The advantage of this approach is that multiple MAVs 4 can be captured on tow line 6 at the same time. As discussed above, different points on tow line 6 will have different speeds, and therefore, different MAVs 4 can fly at slightly different speeds and latch on at different heights on tow line 6. For example, even if two substantially identical MAV's 4 approach extended tow line 6 to be recovered at or about the same time, one of them can slow down, while still maintaining stable flight, and connect to extended tow line 6 at a point lower than the other MAV 4 which has not slowed down, thereby allowing near simultaneous capture of the two MAVs 4.

According to a further exemplary embodiment of the present invention is to measure the position of the end of tow line 6 using a GPS device. Accurate measurement of the end of tow line 6 can determine the effect of the flight path of mother-ship 2 and any perturbations on the end of tow line 6 and thus can be used to direct MAV 4 to tow line 6. Alternatively, the GPS device can be located at a point with zero or near-zero relative velocity (e.g., point E). Differential GPS devices may be used to obtain the relative locations of the tow line 6 and the MAV 4 with very high accuracy.

A second method of determining the position of the end of tow line 6 is to load it with instruments, specifically, an accelerometer-based data logging package. Though the actual position of the end of tow line 6 would not be recorded, the acceleration of the end of tow line 6 will be known, and by comparing this data against the GPS data from mother-ship 2, it is possible to determine the location of tow line 6 and the conditions, if any, that might affect the stability of the end of tow line 6. Submarines use inertial navigation systems that are substantially similar to this method.

According to further exemplary embodiments, it is possible that the effects of drag on tow line 6 will significantly alter the shape of tow line 6 in flight, so a larger or smaller diameter circle can be flown to overcome the effects of drag. Furthermore, the inclusion of a winch that provides the remotely located pilot (in the case of an unmanned aerial vehicle) with the ability to alter the length of tow line 6 in flight as necessary.

As those of ordinary skill in the art can appreciate, the use of tow line 6 is not necessarily limited to the retrieval of smaller MAVs 4 into larger mother-ships 2. For example, larger manned aircraft (acting as mother-ship 2) can benefit from the advantages of the system and methods discussed herein for retrieval of smaller manned or unmanned aircraft by larger aircraft. For example, a transport aircraft can recover UAVs, and smaller manned aircraft.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. A method of using a first aircraft to retrieve at least one second aircraft onto the first aircraft, comprising the steps of:
    flying the first aircraft along a first path;
    extending a tow line from the first aircraft such that the flying of the first aircraft along the first path causes a helical shape to be formed by the extended tow line behind and below the first aircraft;
    determining a point on the extended tow line at which a tow line speed is substantially equal to a second aircraft speed for each of the at least one second aircraft;
    adjusting an altitude of the first aircraft or the at least one second aircraft such that an altitude of the point on the extended tow line at which the tow line speed is substantially equal to the at least one second aircraft speed is substantially equal to an altitude of the at least one second aircraft for each of the at least one second aircraft; and
    securing each of the at least one second aircraft to the extended tow line.

2. The method of claim 1, further comprising the step of retracting the extended tow line and the secured at least one second aircraft into the first aircraft.

3. The method of claim 1, wherein a ratio of a length of the first aircraft to a length of the at least one second aircraft is greater than or equal to 4:1.

4. The method of claim 1, wherein a minimum first aircraft speed is greater than a maximum second aircraft speed.

5. The method of claim 1, wherein the first path is substantially circular.

6. The method of claim 1, wherein the tow line comprises a catch basket positioned at or near a bottom portion of the extended tow line, and the method further comprising the steps of:
    after securing the at least one second aircraft to the extended tow line, flying the first aircraft along a substantially straight path, such that the extended tow line is configured to form a substantially straight line behind and below the first aircraft;
    causing the at least one second aircraft to slide down the extended tow line into the catch basket; and
    retracting the extended tow line, the catch basket, and the secured at least one second aircraft into the first aircraft.

\* \* \* \* \*